UNITED STATES PATENT OFFICE.

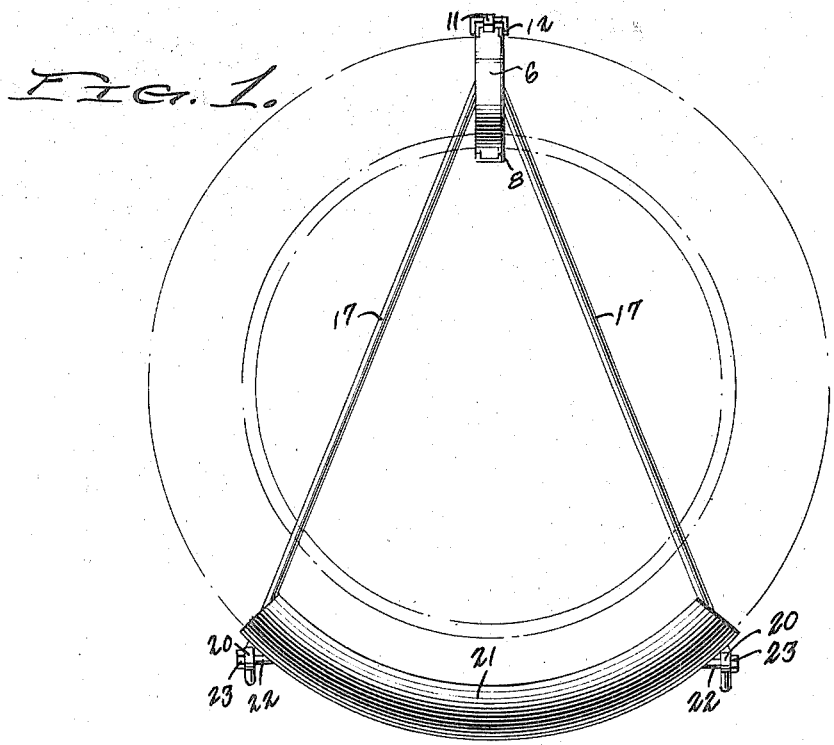
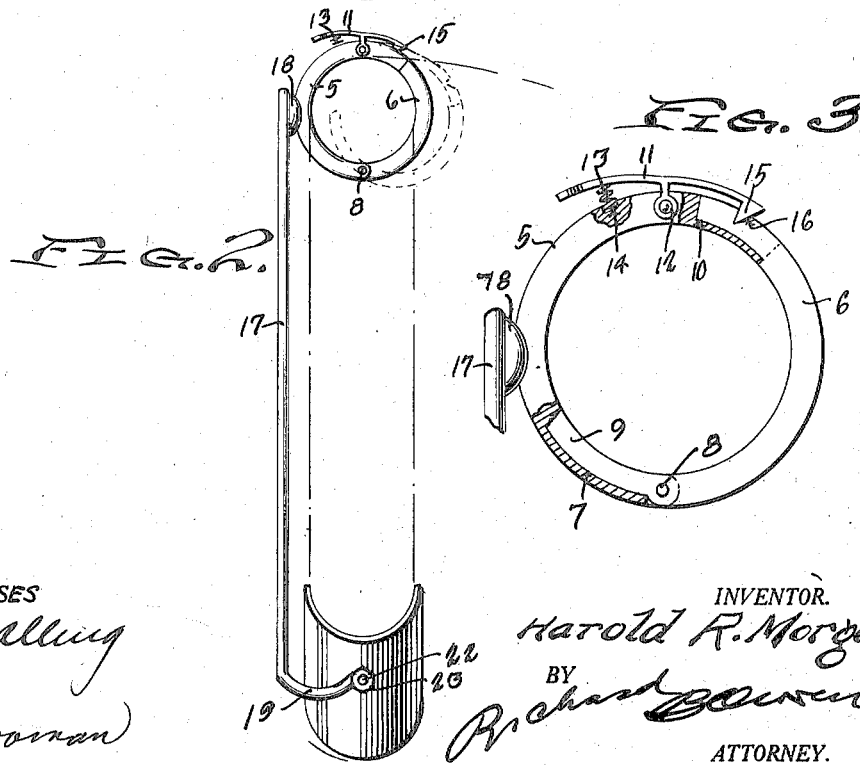

HAROLD R. MORGAN, OF KALONA, IOWA.

TIRE-HOLDER.

1,315,147. Specification of Letters Patent. Patented Sept. 2, 1919.

Application filed March 1, 1919. Serial No. 279,938.

*To all whom it may concern:*

Be it known that I, HAROLD R. MORGAN, a citizen of the United States, residing at Kalona, in the county of Washington and State of Iowa, have invented certain new and useful Improvements in Tire-Holders, of which the following is a specification.

This invention relates to a tire holder and has for its primary object the production of a structure for releasably holding a tire, known as a spare, in a desired place.

Another object of this invention is the production of a tire holder wherein a supporting shell is connected to a clamp, thus allowing the tire to rest upon the shell and be held in position by the clamp.

A still further object of this invention is the production of a tire holder which comprises a sectional clamp having rods leading therefrom, to pivotally support the shell, thus allowing the tire to be placed upon the shell and then swung into engagement with the clamp, whereby the tire will be efficiently supported.

One practical form of construction and assembly of the present invention will be hereinafter described and is illustrated in the drawings, in which:—

Figure 1 is a front elevation of the tire holder,

Fig. 2 is a side elevation of the device,

Fig. 3 is a side elevation, partly in section of the clamp showing the same in a closed position.

In the preferred embodiment of the present invention about to be described, 5 designates the primary section of the clamp and 6 the auxiliary section thereof. The primary section 5 is channeled adjacent one end thereof as indicated at 7 and the auxiliary section 6 is pivotally mounted as indicated at 8 to one end of the primary section 5. This auxiliary section 6 has a projection 9 leading beyond the pivot to fit within the channel 7 as shown in Fig. 3. The two sections are curved in the arc of a circle, whereby when the clamp is in a closed position, a tire will be snugly received therein. The opposite end of the primary section 5 is provided with a socket 10 into which the auxiliary section 6 is received. The latch 11 is pivotally mounted as indicated at 12 upon the primary section 5 and is normally forced in one direction by the coil spring 13 fitting within a socket 14 in the primary section and bearing upon the latch 11. The head 15 on the latch 11 is received within a notch 16 in the auxiliary section 6 thus releasably holding the auxiliary section in a closed position.

A pair of supporting rods 17 are connected to the lug 18 which may be secured in any suitable manner upon the primary section 5 of the frame. These rods 17 diverge toward their lower ends as shown in Fig. 1 and have curved extensions 19 upon which the eyes 20 are formed. These extensions project forwardly as shown in Fig. 2.

A supporting shell 21 is provided, it being noted that this shell is curved throughout its entire length in the arc of a circle, while in cross section it is substantially semicylindrical as shown in Fig. 2 thus causing the shell to fit snugly upon and conform to the shape of the casing placed in engagement therewith. Stems 22 project from the shell 21 adjacent the ends thereof. These stems 22 are carried by the eyes 20 as shown in Fig. 1. Nuts 23 are screwed onto the projecting ends of the stems 22 whereby the shell 21 will be pivotally supported upon the lower ends of the rods 17. Of course the provision of the nuts will hold the rods from spreading and thus disengaging the stems 22 although the stems will rotate within the eyes 20 to permit the shell 21 to swing outwardly or inwardly to accommodate movement of a tire being placed upon or being removed from the holder.

When the device is in use, it is carried in any desired manner upon a supporting structure. At this time the clamp will be directly carried above the shell. Owing to the provision of the extensions 19 upon the lower ends of the rods 17 it will be noted that the shell will be carried in front of the rods and will be permitted to turn inwardly or outwardly. The latch 11 is swung against the tension of the spring 13, thus releasing the auxiliary section 6 and permitting the same to swing forwardly as indicated in dotted lines in Fig. 2. A tire casing may then be placed to engage the shell 21 which will at this time be tilted forwardly and after the entire casing has been placed thereon, the tire will be moved inwardly between the primary and auxiliary sections of the clamp. As the tire is being forced inwardly it will strike the projection 9 and thus move the same into the channel 7 whereby the auxiliary section will be swung to a closed position whereupon the head 15 of the latch 11 will be received in the notch 16 thus latching the clamp in a closed position. Therefore the tire will be efficiently supported by the holder.

When it is desired to move the tire, however, the latch is shifted to release the auxiliary section 6 whereupon the tire may be pulled outwardly from the clamp and simultaneous with this action, the shell will pivot upon its support, thus allowing the tire to be easily lifted from the holder.

The foregoing description and accompanying drawings have reference to what might be considered to be the approved or preferred form of my invention. I desire it to be understood that I may make such changes in the construction, combination and arrangement of parts, materials dimensions, et cetera, as may prove expedient and fall within the scope of the appended claims.

Having thus fully described my invention what I claim as new and desire to secure by Letters Patent, is:—

1. In a device of the character described, the combination of a sectional clamp, said clamp including a latching mechanism, one section of the clamp having a projection, depending supporting rods carried by said clamp, a tiltable shell mounted upon said supporting rods, whereby the shell may be tilted outwardly, thus allowing a tire to be placed upon the shell and then be tilted inwardly to cause the tire to be directly moved into engagement with the clamp to cause the projection to be struck and the sectional clamp swung to a closed position to allow the latching mechanism to hold the clamp in a closed position, thus causing the tire to be retained by the clamp and supported by the shell.

2. In a device of the character described, the combination of a sectional clamp, said clamp including a latching mechanism, one section of the clamp having a projection, a shell, means tiltably supporting said shell below said clamp, whereby the shell may be tilted outwardly, thus allowing a tire to be placed upon the shell and tilted inwardly to cause the tire to be directly moved into engagement with the clamp to cause the projection to be struck and the sectional clamp swung to a closed position to allow the latching mechanism to hold the clamp in a closed position, thus causing the tire to be retained by the clamp and supported by the shell.

3. In a device of the character described, the combination of a sectional clamp, said clamp including a latching mechanism, one section of the clamp having a projection, supporting means carried by and depending below said clamp, a shell tiltably mounted on said supporting means below said clamp as and for the purpose set forth.

In testimony whereof I affix my signature in presence of two witnesses.

HAROLD R. MORGAN.

Witnesses:
H. W. BENN,
LU VERNE G. BUSH.